Aug. 27, 1957   H. V. PETERS   2,803,849
SANITARY SHOPPING CART OR CARRIAGE HANDLE
Filed Aug. 5, 1955
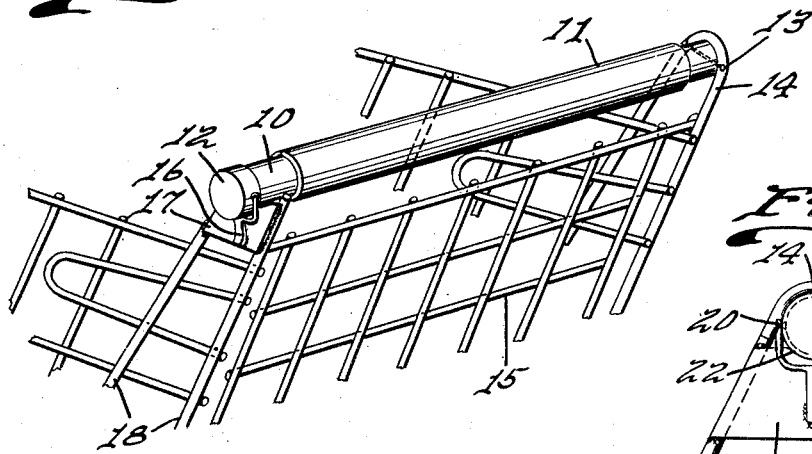
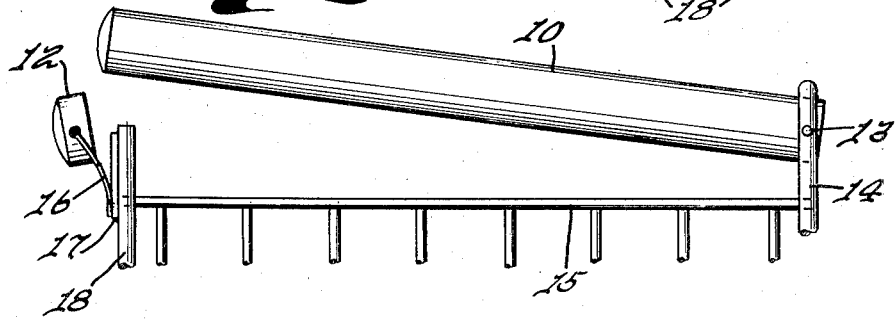
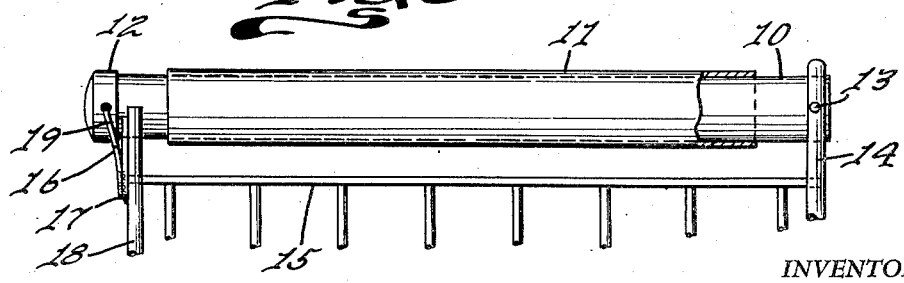
INVENTOR.
Harvey V. Peters
BY Victor J. Evans & Co.
ATTORNEYS

United States Patent Office 2,803,849
Patented Aug. 27, 1957

2,803,849

SANITARY SHOPPING CART OR CARRIAGE HANDLE

Harvey V. Peters, Leominster, Mass.

Application August 5, 1955, Serial No. 526,666

2 Claims. (Cl. 16—111)

This invention relates to carriers, such as used in serve yourself chain stores where numerous customers grip the handles daily, and in particular, a cart or carriage having a tubular handle wherein the handle is pivotally mounted at one side of the carrier and retained in position by a cap at the opposite side, whereby paper tubular gripping elements may be used on the handle and wherein the said paper tubes are adapted to be removed after the cart or carrier is used by a customer and whereby each customer is provided with a new or sanitary gripping tube.

The purpose of this invention is to reduce the possibility of picking up disease germs from handles of carriers where carriers are used by different persons continuously.

The conventional shopping carrier is provided with a metal tubular handle and after use by a customer the carrier, in most cases, is immediately taken by another customer with the new customer gripping the same handle. Although the general run of customers are comparatively clean, in numerous instances a customer having or having recovered from a contagious disease, or a customer being employed in comparatively rough work may leave disease or other germs on the handle and such germs may be immediately picked up by a following customer. With this thought in mind, this invention contemplates a cover for the conventional metal tubular handle wherein the cover is adapted to be removed and replaced after each use of the carrier.

The object of this invention is, therefore, to provide means whereby a sanitary tubular paper cover may be provided on a handle of a shopping carrier so that the tubular paper cover may readily be removed and replaced.

Another object of the invention is to provide means for providing a tubular paper cover on a handle of a shopping carrier without materially changing the size or construction of the carrier.

A further object of the invention is to provide a shopping carrier handle having a readily replaceable sanitary cover in which the handle and cover are of simple and economical construction.

With these and other objects and advantages in view, the invention embodies a wire cart or shopping carrier, a tubular handle extended across one end of the carrier, means for pivotally mounting the handle on the carrier at one side thereof, means for temporarily retaining the end of the handle in operative position at the opposite side of the carrier, and a paper tube adapted to be slipped over the tubular handle.

Other features and advantages of the invention will appear from the following description, taken in connection with the drawing, wherein:

Figure 1 is a perspective view showing the upper corner of a shopping carrier illustrating the use of a tubular paper cover on the handle of the carrier.

Figure 2 is an end elevational view of the upper corner of the carrier shown in Figure 1 with the parts shown on an enlarged scale showing the handle of the carrier with the paper tube removed and with one end of the handle released.

Figure 3 is an elevational view similar to that shown in Figure 2 showing the device with the paper tube positioned on the handle and with the extended end of the handle positioned in a retaining cap whereby the handle is in position for use with the paper tube thereon and with one end of the paper tube broken away and the remaining part shown in section.

Figure 4 is an end elevational view looking toward the end of the upper corner of the cart at which the handle is retained in position by a cap showing the mounting of the cap on the carrier.

Referring now to the drawing, wherein like reference characters denote corresponding parts, the improved sanitary handle of this invention includes a cylindrical handle 10, a tubular paper cover 11, a friction gripping cap 12, a pin 13 with which the handle 10 is pivotally mounted in an inverted U-shaped loop 14 at one side of a carrier 15, and an arm 16 of resilient material, secured, such as by welding, to a plate 17 also secured, such as by welding, to upper ends of rods 18 similar to corresponding parts of the loop 14, the plate 17 being secured to the rods by welding or other suitable means. The upper end of the arm 16 is provided with a yoke 19 the arms of which are secured by pins 20 and 21 to the cap 12.

The upper edge of the plate 17 is provided with an arcuate recess 22 in which the end of the handle 10 is retained by the cap 12.

The rods 18 and also the loop 14 form an integral part of a cart, carriage, or carrier and in some types of carriers these parts are conventional, as illustrated in Figure 1. It will be understood, however, that similar rods and loops may be secured to sides of the carrier such as by welding, or by other means.

With the parts assembled as illustrated and described, it is only necessary to move the cap 12 from the end of the handle 10 so that the end of the handle may be extended upwardly, as shown in Figure 2, and with the handle in this position, a paper tube 11 may readily be placed over the handle. With the paper tube in position, the end of the handle is moved downwardly and the cap 12 replaced.

Although the handle 10 has been described as being tubular, it will be understood that the handle may be formed of a solid rod or other suitable material, and although the tube 11 is described as being made of paper, the tube may also be formed of plastic or other material.

It will be understood that modifications, within the scope of the appended claims, may be made in the design and arrangement of the parts without departing from the spirit of the invention.

What is claimed is:

1. A carrier handle comprising a rod, an inverted U-shaped loop adapted to be positioned on a side of a carrier, a pin extending through said loop and receivable in one end of said rod for pivotally mounting said one end of the rod in the loop, parallel spaced rods positioned on the opposite side of the carrier in alinement with said U-shaped loop, a mounting plate secured to upper ends of the rods, a spring arm secured to the mounting plate and having a yoke on the extended end, a circular cap mounted in said yoke, said yoke, spring arm and mounting plate being positioned whereby the cap is adapted to flex outwardly to extend over the end of the rod forming the handle opposite to the end pivotally mounted in the loop when said rod is extended transversely of the carrier in alinement with said cap, and a paper tube removably positioned on said rod and adapted to extend substantially the full length of said rod, said tube being removable when said rod is disconnected from said cap, 2. In a carrier, the combination which comprises a loop extended upwardly at one side of the carrier, parallel spaced rods extended upwardly on the side of the carrier opposite to that on which the loop is positioned and in alinement with said loop, a mounting plate having a recess in the upper edge secured to upper ends of said rods, a spring arm secured to the mounting plate, a circular cap carried by the extended end of the spring arm, a rod, a pin extending transversely of one end of said rod and extending through said loop for pivotally mounting said rod in the loop at one side of the carrier and positioned whereby the opposite end is adapted to be extended transversely of the carrier and frictionally held in the cap whereby said cap will retain said rod in the recess in said mounting plate, and a paper cover adapted to be removably mounted on said rod when said rod is disconnected from said cap.

References Cited in the file of this patent
UNITED STATES PATENTS

| | | |
|---|---|---|
| 358,392 | Grove | Feb. 22, 1887 |
| 1,655,174 | White | Jan. 3, 1928 |
| 2,535,466 | Turner | Dec. 26, 1950 |
| 2,619,672 | Glaser | Dec. 2, 1952 |
| 2,621,358 | Christman | Dec. 16, 1952 |
| 2,644,695 | Enders | July 7, 1953 |
| 2,689,132 | Forest | Sept. 14, 1954 |